Patented Jan. 22, 1946

2,393,438

UNITED STATES PATENT OFFICE 2,393,438

COPOLYMERS

Samuel M. Weisberg, Edwin G. Stimpson, and Joseph Greenspan, Baltimore, Md., assignors to Sealtest, Inc., Baltimore, Md., a corporation of Maryland No Drawing. Application September 13, 1943, Serial No. 502,200

3 Claims. (Cl. 260—8)

This invention relates to the copolymerization of an alkyl acrylate and isoprene in an alkaline solution in the presence of a caseinate, and to a copolymer of the acrylate and isoprene with the casein in the final copolymer product.

It has been proposed previously to copolymerize butadiene or isoprene with an acrylic acid derivative, but in such a process the butadiene or other diolefin has been used in an amount which exceeds the amount of the acrylic acid derivative. This polymerization also has been carried out in an acid medium and in accordance with a process which requires a relatively long time for the polymerization.

In accordance with this invention it has been discovered that an elastic polymer product can be obtained in good yields in a relatively short time and with only moderate amounts of isoprene. This polymer product can be vulcanized with sulphur in accordance with the technique established in the rubber industry to yield a product simulating natural vulcanized rubber and useful for many of the same purposes.

Accordingly, it is an object of the invention to copolymerize an alkyl acrylate, more particularly methyl acrylate, with an amount of isoprene which is less than the amount of the acrylate.

It is a further object of the invention to carry out the copolymerization in an alkaline medium, more particularly at a pH value within the range of 7.0 to 11 at the start of the copolymerization.

Still a further object of the invention is to carry out the polymerization in an alkaline aqueous medium, in which this is accomplished by means of the alkalinity of the caseinate, following which the polymer may be coagulated by rendering the emulsion acidic.

An additional object of the invention is to copolymerize isoprene and the acrylate in the presence of a caseinate, preferably triethanolamine caseinate, which has an effect upon the stability of the emulsion and upon the coagulating characteristics of the emulsion at the conclusion of the polymerization, and which caseinate enters into the polymer and affects the tensile strength, elongation and recovery. It is also an object to produce a polymer in which the casein is an integral constituent thereof and is not removable therefrom.

An additional object of the invention is to provide a process in which the polymerization may be accomplished to obtain relatively large yields of the copolymer in a reasonably short period of time.

It is a further object of the invention to provide a copolymer product which may be readily cured by vulcanization with sulphur in the presence of the usual sulphur vulcanizing accelerators and utilizing the conventional rubber vulcanization technique.

Additionally, it is an object of the invention to provide a copolymer which when vulcanized with sulphur has a high tensile strength, good elasticity and enhanced wearing quality, so that it may be used for purposes for which natural rubber and synthetics have heretofore been proposed.

The manner in which the invention may be practiced will be readily understood from the following description of the preferred embodiments and the permissive variations within the same.

In general, it is possible to obtain the new copolymer product using the following ranges of ingredients:

| Ingredient | Units | Amount |
|---|---|---|
| Water | parts | 50 to 200 |
| Emulsifying agent | do | 1 to 25 |
| Alkaline casein solution (containing 10 to 20% casein and sufficient alkalinity to impart a pH value to the solution within the range of 7 to 11) | parts | 1 to 45 |
| Methyl acrylate | do | 85 |
| Isoprene (based on the weight of methyl acrylate) | per cent | 1 to 99 |
| Sodium perborate (or other peroxide compound) | parts | 0.05 to 5 |

As indicative of a specific example within the above general formula, and using higher levels of isoprene, the following is given:

Example I

| | | | |
|---|---|---|---|
| (1) | Water | cc | 940 |
| (2) | Triton No. 720 (undiluted) | do | 250 |
| (3) | Triethanolamine-caseinate (12.5%) (pH 9.35) | cc | 680 |
| (4) | Methyl acrylate | do | 1360 |
| (5) | Isoprene | do | 720 |
| (6) | Sodium perborate | gms | 30 |

As illustrative of another formula using a smaller amount of isoprene, the following is given:

Example II

| | | |
|---|---|---|
| Methyl acrylate | cc | 400 |
| Sodium perborate | gms | 1.2 |
| Triton #770 (10% solution) | cc | 266 |
| Water | do | 410 |
| Isoprene | do | 8 |
| Triethanolamine-caseinate (14%) | do | 80 |

In carrying out copolymerization, the water, emulsifying agent and casein solution are at first well mixed. The amount of water in the aqueous emulsion system should preferably be not less than 40%. Following this, the methyl acrylate and isoprene are added, with thorough mixing. Finally, the sodium perborate or other peroxide compound is added slowly, such as by dusting it in with good agitation. When all of these ingredients are thoroughly mixed, the temperature is gradually raised to about 100 to 120° F. The mixture is continuously agitated under reflux and the temperature gradually raised over the period of the polymerization. For example, the temperature at the start of the polymerization may be about 120 to 125° F. and at the finish the temperature may be about 150° F.

The temperature may also be raised immediately to whatever operating temperature is desired providing the work is being done in a closed vessel capable of withstanding pressure up to 50 pounds per square inch.

The copolymerization under agitation and reflux is continued for about 5 to 50 hours. At the conclusion of the polymerization, any unreacted acrylate and isoprene may be steamed-distilled or otherwise distilled out of the emulsion and added to a fresh polymerization batch. When the reaction is complete the mixture is cooled and then coagulated by mixing into it an amount of acetic acid to render the mixture acid. Other acids than acetic may be used for the precipitation of the polymer and these acids may be either organic or mineral, such as citric acid, sulfuric acid, hydrochloric acid, lactic acid, formic acid, propionic acid, tartaric acid, etc. Various salts are also quite efficient in precipitating the polymer or a mixture of salts and acid may be used. One such mixture would be a solution containing 1% sulfuric and 3% sodium chloride. In place of sodium chloride for the precipitating brine, calcium chloride or magnesium chloride may also be used. This results in the formation of a curd which is washed with water until free from acid, and then dried.

In an alternative embodiment of the process, only a part of the methyl acrylate is added initially, and the balance of the methyl acrylate and the isoprene may be added gradually over the course of the first part or all of the polymerizing period.

The casein, for convenience, is dissolved with the agent to impart the alkalinity, the latter being in an amount to provide the requisite pH value. Alternatively, the casein solution may be prepared using just enough of the alkaline material to place the casein in solution. This may be added to the emulsion as such, together with an additional quantity of the alkaline material sufficient to impart a pH value of 7.0 to 11, to the complete emulsion. In general, the emulsion should have a pH value of over 7 and if desired, an additional buffer may be included to maintain the pH value within the desired range. The proper pH value has a marked accelerating action on the rate of the polymerization and also on the yields obtained. The amount of alkaline material is one of the most significant factors in the invention. It has been found, for example, that when the polymerization is carried out with an insufficient amount of alkaline material, the reaction rate is very slow. On the other hand, if too large a quantity of alkaline material is used, the reaction rate is also slowed down, the yield is poorer and the resulting polymer is not of a satisfactory nature.

It has been ascertained definitely that the presence of the caseinate has a marked effect upon achieving greater stability of the emulsion and on the coagulating characteristic of the emulsion at the time it is acidified. The exact manner in which the casein enters into the polymer has not been definitely determined; it has been ascertained, however, that the casein enters into the long chain molecules during the polymerization, because the final polymer including the casein is totally soluble in benzene; whereas free casein is not soluble in benzene at all.

The use of casein is thought to be highly important, as it is necessary in producing a polymer or copolymer by emulsion polymerization to obtain not only a good emulsion but one which may be easily precipitated and which produces that precipitate in a form such that it may be washed and dried. In other words to polymerize in a stable emulsion is only one aspect of the problem from the standpoint of production in commercial quantities, and it is just as important to polymerize in such a way that the resulting polymer can be economically recovered by industrial methods and equipment and the dried polymer prepared on a satisfactory cost basis.

To this end it is thought that the invention, especially with regard to the use of triethanolamine caseinate is of the utmost significance. The invention is not limited to the use of any one ratio of casein to triethanolamine, and the pH of the emulsion may be varied by the pH of the caseinate prepared. An excess triethanolamine may be added to the emulsion to adjust the pH when using a preferred alkaline caseinate, such as that having a pH of 9.35 as given in Example I.

An example of this varying of the casein and triethanolamine are indicated in the following table where runs were made with caseinate and triethanolamine at various concentrations.

Using a mixture of 29.5 parts water, 3.5 parts Triton 770, 24 parts acrylate, 18 parts isoprene and 0.5 part sodium perborate as a base the caseinate and triethanolamine were varied with the following results:

| Caseinate | 66% solution triethanolamine | Total solids at end polymerization | Emulsion formed | Precipitate formed |
|---|---|---|---|---|
| 3 | 2 | 28 | Good | Good. |
| 6 | 1 | 26 | do | Do. |
| 12 | 0 | 30 | do | Do. |
| 3 | 1 | 21 | Poor | Do. |
| 0 | 0 | 16 | do | Doughy. |
| 0 | 2 | 15 | Fair | Do. |
| 0 | 4.5 | 25 | Poor | Do. |

From this it may be seen the casein is very important and that in addition to assuring a good emulsion with high yields, it also helps in making it possible to precipitate the polymer in discreet particles which can be washed easily, dried and packed for shipment. When triethanolamine is present without casein present poor emulsions result as well as polymers which are very doughy and difficult to handle, wash or dry.

It may seem therefore that depending on the ratio of acrylate to isoprene a satisfactory commercial polymerization depends at least in part on the proper ratio of triethanolamine being present in the caseinate used in preparing the emulsion.

If desired, the polymerization may be carried out under moderate pressure so that the temperature may be as high as 250° F. The use of elevated temperatures, made possible by an increase in pressure, greatly improves the yield and shortens the time of the polymerization, but it is an advantage of the process that good yields may be obtained in a reasonably short time at atmospheric pressure.

We have found that the proper temperature is important in obtaining uniform polymers. Thus polymerizations which are conducted entirely below 140° F. have a tendency to be tougher and drier than those produced at a higher temperature. Such polymers, however, may be desired for certain uses. Polymerizations run at higher temperatures of 155 to 175° F. are on the whole more satisfactory for producing polymers to use as rubber substitutes.

The emulsifying agent may be any of the sulfated or sulfonated compounds having surface-active properties. These include alkyl aryl sulfonates, known as "Nacconal" and "Santomerse"; higher alkyl sulfates, known as "Gardinols," sulfonated amides and taurides, such as "Igepons" and aryl alkyl polyether sulfates, referred to as "Tritons." A list of the surface-active agents suitable for emulsifying, and commercially available for use in connection with the invention, is described on page 126 et seq. in Industrial and Engineering Chemistry for January, 1943.

Instead of triethanolamine it is possible to use any of the organic alkaline compounds generally recognized as organic bases, such as the primary and secondary alkylamines, other alkylolamines and quaternary ammonium bases, for example, tetraethanolammonium hydroxide, methyl diethanolamine and monoethanolamine.

The oxidation catalyst preferably is sodium perborate, but many other peroxide compounds, such as benzoyl peroxide, pyrophosphate peroxide, or urea peroxide may be used. Also other oxidizing compounds such as ferricyanides, persulfates, etc.

The proportions of acrylate and isoprene may be varied as indicated. While the inclusion of isoprene in an amount as low as 1% is capable of permitting vulcanization with good rubber-like qualities, it has been found as a practical matter that a commercially desirable copolymer should probably have not less than 5% isoprene. The proportions of the monomers also have some effect upon the rate of the reaction and the yield. With higher amounts of acrylate, larger yields can be obtained in shorter times. For example, 18 parts by volume of isoprene copolymerized with 136 parts by volume of methyl acrylate will yield 66% copolymer in 22 hours, whereas a ratio of 36 parts by volume of isoprene and 136 parts of methyl acrylate yielded 65% copolymer in 32 hours.

It has also been found that the polymerization may be carried out with advantage using a so-called directing agent, such as the aromatic mercaptans, for example alpha and beta naphthyl mercaptans, and alkyl mercaptans, such as butyl and amyl mercaptans. The mode of operation of the directing agent is not entirely understood but it seems to act in some way to suppress cross-linking of the polymer chains during polymerization and prior to vulcanization. The amount of the directing agent should be relatively small and an amount of the order of 0.001 to 0.5%, based on the entire emulsion mixture, is adequate. Excessive amounts lead to sticky and doughly polymers.

It has also been found that the polymerization may be carried out in the presence of a small amount of a compound generally recognized as a polymerization inhibitor, such as meta cresol, hydroquinone, copper sulfate, copper lactate, thiourea and tannic acid. The effect of the inhibitor is also not entirely understood but it is thought that the inhibitor helps to equalize copolymerization rates of the acrylate and the isoprene. In any event improvement is reflected in physical constants, such as tensile strength and elastic recovery to an extent of 25 to 50%. There is also an improvement in the milling properties. The inhibitor also should be used in a relatively small amount of the same order as that described for the directing agent, since excessive amounts prevent all polymerization.

The directing agents and the inhibitors may be used in conjunction with each other or separately.

The product obtained in accordance with Example I, after being dried at a temperature not in excess of 230° F., was sheeted on a two-roll mill and compounded in accordance with the following formula:

| | Parts |
|---|---|
| Polymer | 100.00 |
| Carbon black | 25.00 |
| Zinc oxide | 5.00 |
| Captax | 1.00 |
| Phenyl-naphthylamine | 2.00 |
| Stearic acid | 3.00 |
| Sulphur | 1.50 |

This mixture was then cured at a temperature corresponding to 40 pounds per square inch steam pressure, with the following results:

| Cure time in minutes | Elongation modulus 300% in #/sq. in. | Tensile strength at break in #/sq. in. | Ultimate elongation in #/sq. in. | Shore hardness | Recovery |
|---|---|---|---|---|---|
| 5 | 660 | 930 | 460 | 67 | 65 |
| 10 | 784 | 1,172 | 440 | 67 | 65 |
| 15 | 1,042 | 1,260 | 400 | 67 | 65 |
| 20 | 1,318 | 1,524 | 380 | 70 | 67 |
| 30 | 1,380 | 1,548 | 340 | 72 | 70 |

From the above table it will be seen that the product may be cured readily in 20 to 30 minutes.

Rubber heels were made from the above compounded mixture and these were cured in molds at temperatures above mentioned for 30 minutes. The rubber heels satisfactorily passed abrasion tests.

As illustrative of an additional example, the polymer made in accordance with Example I was compounded according to the following formula, containing an increased amount of carbon black:

| | Parts |
|---|---|
| Polymer | 100 |
| Carbon black | 40 |
| Zinc oxide | 5 |
| Captax | 1 |
| Phenyl-naphthylamine | 2 |

|                | Parts |
|----------------|-------|
| Stearic acid   | 3     |
| Sulfur         | 1.5   |
| Bardol         | 5     |

This mixture was cured in rubber heel molds at 40 pounds per square inch steam pressure for 20 minutes. The rubber heels satisfactorily passed abrasion tests, showed a tensile strength of 2000 pounds per square inch, a maximum elongated of 320%, and a hardness of 67 to 76 when tested on the Shore durometer.

It is apparent from the above examples that the simple sulfur vulcanization technique as practiced in the rubber industry suffices to vulcanize the new copolymer readily.

As illustrative of the curing of the copolymer containing a small amount of isoprene, a copolymer made in accordance with Example II was compounded in accordance with the following formula:

|                  | Parts |
|------------------|-------|
| Polymer          | 200   |
| ZnO              | 10    |
| Sulfur           | 8     |
| Stearic acid     | 4     |
| Selenac          | 4     |
| Tuad             | 3     |
| Altax            | 1     |
| Bardol           | 16    |
| Zinc linoresinate| 6     |

The vulcanizing conditions and the results are as follows:

| Vulcanizing conditions | Results |
|------------------------|---------|
| Control (no heating)   | Little elasticity and strength. |
| 20 minutes at 200° F   | Elasticity and strength increase. |
| 45 minutes at 200° F   | Strong and elastic. |
| 85 minutes at 200° F   | Very strong, less elastic. |

From this example, it will be seen that an excellent vulcanization is obtained when the copolymer contains only a low percentage of isoprene.

The copolymer, in addition to having the advantages in the manufacture thereof listed above, is characterized by a particular ease of breakdown on the mill and a tack and plastic flow before vulcanization. This facilitates and simplifies the milling operation, as compared with other synthetic polymers which are often extremely difficult to mill, and also the molding operation. After vulcanization, the product possesses a high tensile strength and elastic properties characterized by a quick and complete recovery. Tensile strengths of 2400 with recovery of 520% have also been obtained with our copolymers.

It will be apparent that the invention includes numerous modifications and variations from the specific examples, but within the generic disclosure. All such variations and modifications are intended to be within the invention as are within the scope of the following claims.

We claim:

1. A method of forming a polymer product which comprises copolymerizing an alkyl ester of acrylic acid and isoprene in an aqueous emulsion containing a caseinate and a peroxide catalyst, the ingredients being in the following proportions:

| | |
|---|---|
| Water parts | 50 to 200 |
| Emulsifying agent do | 1 to 25 |
| Alkaline casein solution (containing 10 to 20% casein and sufficient alkalinity to impart a pH value to the solution within the range of 7.0 to 11) parts | 1 to 45 |
| 7.0 to 11) do | 1 to 45 |
| Alkyl ester of acrylic acid do | 85 |
| Isoprene (based on the amount of alkyl ester of acrylic acid per cent | 1 to 99 |
| Peroxide compound parts | 0.05 to 5 | and acidifying the emulsion, whereby a polymer product is formed containing casein as an inseparable part thereof.

2. A method of forming a polymer product which comprises copolymerizing an alkyl ester of acrylic acid and isoprene in an aqueous emulsion containing a caseinate and a peroxide catalyst, the ingredients being in the following proportions:

| | |
|---|---|
| Water parts | 50 to 200 |
| Emulsifying agent do | 1 to 25 |
| Alkaline casein solution (containing 10 to 20% casein and sufficient alkalinity to impart a pH value to the solution within the range of 7.0 to 11) parts | 1 to 45 |
| Alkyl ester of acrylic acid do | 85 |
| Isoprene (based on the amount of alkyl ester of acrylic acid) per cent | 1 to 99 |
| Peroxide compound parts | 0.05 to 5 | continuing the copolymerization at a temperature of 100° F. to 250° F. until the desired yield is obtained, acidifying the emulsion whereby a polymer product is formed containing casein as an inseparable part thereof, washing the polymer product, and drying the same.

3. A method of forming a polymer product which comprises copolymerizing methyl acrylate and isoprene in an aqueous emulsion containing triethanolamine caseinate and a sodium perborate catalyst, the ingredients being in the following proportions:

| | |
|---|---|
| Water parts | 50 to 200 |
| Emulsifying agent do | 1 to 25 |
| Triethanolamine caseinate (containing 10 to 20% casein and sufficient alkalinity to impart a pH value to the solution within the range of 7.0 to 11) parts | 1 to 45 |
| Methyl acrylate do | 85 |
| Isoprene (based on the amount of methyl acrylate) per cent | 1 to 99 |
| Sodium perborate parts | 0.05 to 5 | continuing the copolymerization at a pH value within the range of 7.0 to 11 and at a temperature of 100° F. to 250° F. for a period of 5 to 50 hours, acidifying the emulsion with acetic acid whereby a polymer product is formed containing casein as an inseparable part thereof, washing the polymer product, and drying the same at a temperature of less than 230° F.

SAMUEL M. WEISBERG.
EDWIN G. STIMPSON.
JOSEPH GREENSPAN.

Certificate of Correction

January 22, 1946.

Patent No. 2,393,438.

SAMUEL M. WEISBERG ET AL.

It is hereby certified that errors appear in the printed specification of the above numbered patent requiring correction as follows: Page 4, second column, line 8, strike out "7.0 to 11) ----------do---- 1 to 45"; line 11, after the word "acid" insert a closing parenthesis; and that the said Letters Patent should be read with these corrections therein that the same may conform to the record of the case in the Patent Office.

Signed and sealed this 23d day of April, A. D. 1946.

[SEAL]

LESLIE FRAZER,
*First Assistant Commissioner of Patents.*